United States Patent
Zheng et al.

(10) Patent No.: US 12,541,445 B2
(45) Date of Patent: Feb. 3, 2026

(54) METHOD FOR MONITORING AND MAINTAINING HEALTH STATE OF ELECTRICAL DEVICE, AND ELECTRONIC DEVICE

(71) Applicant: ABB Schweiz AG, Baden (CN)

(72) Inventors: Wei Zheng, Fujian (CN); Zhui Wang, Fujian (CN); Longbin Huang, Fujian (CN); Zhen Chen, Fujian (CN); Changhui You, Fujian (CN)

(73) Assignee: ABB SCHWEIZ AG, Baden (CH)

( * ) Notice: Subject to any disclaimer, the term of this patent is extended or adjusted under 35 U.S.C. 154(b) by 153 days.

(21) Appl. No.: 18/525,065

(22) Filed: Nov. 30, 2023

(65) Prior Publication Data

US 2024/0193064 A1 Jun. 13, 2024

(30) Foreign Application Priority Data

Dec. 9, 2022 (CN) .......................... 202211591892.8

(51) Int. Cl.
| | |
|---|---|
| *G06F 11/32* | (2006.01) |
| *G02B 5/32* | (2006.01) |
| *G06T 19/00* | (2011.01) |
| *G06T 19/20* | (2011.01) |
| *G06V 40/20* | (2022.01) |

(52) U.S. Cl.
CPC .............. *G06F 11/328* (2013.01); *G02B 5/32* (2013.01); *G06T 19/006* (2013.01); *G06T 19/20* (2013.01); *G06V 40/23* (2022.01)

(58) Field of Classification Search
CPC ...... G06F 11/328; G06T 19/006; G06T 19/20
See application file for complete search history.

(56) References Cited

U.S. PATENT DOCUMENTS

| | | | |
|---|---|---|---|
| 10,846,943 B2 | 11/2020 | Gonzalez Aguirre et al. | |
| 2016/0035246 A1 | 2/2016 | Curtis | |
| 2016/0225192 A1* | 8/2016 | Jones | G06F 3/017 |
| 2021/0096824 A1 | 4/2021 | Stump | |

FOREIGN PATENT DOCUMENTS

| | | |
|---|---|---|
| CN | 104091482 B | 4/2015 |
| CN | 103034755 B | 3/2016 |
| CN | 106843497 A | 6/2017 |
| KR | 101976785 B1 | 5/2019 |
| WO | 2021019723 A1 | 2/2021 |
| WO | 2022032688 A1 | 2/2022 |

* cited by examiner

*Primary Examiner* — Charles Tseng
(74) *Attorney, Agent, or Firm* — GREENBERG TRAURIG, LLP (57) ABSTRACT

Methods and devices for monitoring and maintaining a health state of an electrical device. The methods can include obtaining a first operation state of the electrical device; rendering a holographic image of the electrical device and a first health state of the electrical device indicated by the first operation state by using a mixed reality device; detecting an action of a first user by using the mixed reality device; in response to that an operation performed by the first user on the electrical device has been detected, performing the operation on an image model of the electrical device in the holographic image to obtain a second operation state after the electrical device is operated; and updating the first health state to a second health state indicated by the second operation state.

15 Claims, 10 Drawing Sheets

METHOD FOR MONITORING AND MAINTAINING HEALTH STATE OF ELECTRICAL DEVICE, AND ELECTRONIC DEVICE

CROSS-REFERENCE TO RELATED APPLICATIONS

This is a national stage application claiming priority to Chinese patent application Serial No.: 202211591892.8, filed on Dec. 9, 2022; which is herein incorporated by reference in its entirety.

FIELD

Exemplary embodiments of the present disclosure relate to the field of digital factories, and more particularly, to a method for monitoring and maintaining a health state of an electrical device, an electronic device, and a computer-readable storage medium.

BACKGROUND

In the field of automation, energy and asset management (EAM) is an important topic for most energy-related factories. Software-based management systems are widely used for EAM. With the increasing demand for carbon neutrality, factory management faces a series of challenges in planning energy use, such as evaluating profiles of site energy consumption, saving energy, reducing carbon emissions, reducing power outages, and integrating distributed energy.

According to another aspect, the increasing use of embedded sensors in electrified power distribution assets has brought another series of challenges: interpreting a large amount of sensor data collected from assets, identifying current asset abnormalities, maintaining electrical devices, improving the safety, and reducing on-site hazards. Therefore, it is expected to implement more efficient energy and electrical device management methods.

SUMMARY

Embodiments of the present disclosure provide a solution for showing electrical devices in an entire factory facility to a user using a mixed reality device, and aim to at least solve the problems in energy and electrical device management in the existing technology.

A first aspect of the present disclosure relates to a method for monitoring and maintaining a health state of an electrical device, including: obtaining a first operation state of the electrical device from a sensing apparatus in the electrical device: rendering a holographic image of the electrical device and a first health state of the electrical device indicated by the first operation state by using a first display apparatus of a mixed reality device: detecting an action of a first user by using a first image capturing apparatus of the mixed reality device: in response to that an operation performed by the first user on the electrical device has been detected, performing the operation on an image model of the electrical device in the holographic image to obtain a second operation state after the electrical device is operated; and updating the first health state to a second health state indicated by the second operation state.

In a factory, electrical devices (for example, a switch cabinet, a circuit breaker, and a transformer) usually have evaluation values for their health states to indicate probabilities of failure. For example, if an electrical device has a high health state evaluation value, it indicates that the electrical device has a small probability of failure. A health state can be evaluated through multiple dimensions, for example, time, a temperature, humidity, an air pressure, a wind speed, and lighting information of an environment where an electrical device is located. For example, the health state can also be an electrical condition of a power grid where the electrical device is located, including a voltage, a current, power, a flowing direction of power, a power factor, and electric energy quality information. The evaluation value can be weighting of a plurality of pieces of data in the operation state of the electrical device. According to the embodiments of the present disclosure, the holographic image of the electrical device in the factory is presented to the user through the display apparatus of the mixed reality device, the user can clearly and conveniently learn about operation states of all electrical devices in the factory. Meanwhile, by the interaction with the holographic image and the presentation of an interaction result, the user can clearly know the influence caused by the operation of the user on the health state of the electrical device and intuitively know whether the operation is valid.

In some embodiments, the performing the operation on the holographic image includes: mapping the action of the first user into the holographic image to obtain a virtual trajectory of the action in the holographic image; determining an operation matched with the virtual trajectory; simulating a digital model of the electrical device under the operation to obtain simulated data; and adjusting the holographic image into the second operation state indicated by the simulated data. In such an embodiment, by mapping the action of the user into a space of the holographic image, the digital model of the electrical device can be simulated to obtain a result generated by the operation of the user.

In some embodiments, the method further includes: in response to a determination that the operation includes an operation performed on an actuating mechanism of the electrical device, generating an operating instruction; and sending the operating instruction to the actuating mechanism, so that the actuating mechanism executes the operating instruction. In such an embodiment when it is confirmed that the result generated by the operation of the user is desirable, the instruction of the operation can be directly sent to the real actuating mechanism to perform the operation on the electrical device in a real factory.

In some embodiments, the method further includes: in response to a determination that the electrical device has an abnormality, generating prompt information which indicates the abnormality; rendering the prompt information in the holographic image; and in response to that a selection operation performed by the first user on the prompt information has been detected, rendering, in the holographic image, the abnormal electrical device and operation data associated with the abnormality. In such an embodiment, when the electrical device in the factory has a failure or an abnormality, the prompt information can be automatically presented to the user at a corresponding position, such as at the vicinity of the abnormal device. When the user performs the selection operation on the prompt information, the abnormal electrical device and the operation data of the abnormality are presented to the user. In this way, the user can quickly view the abnormal electrical device.

In some embodiments, the rendering the abnormal electrical device and operation data includes: determining an abnormal component, causing the abnormality, in the electrical device; rendering a maintenance plan for the abnormal component in the holographic image; and rendering the abnormal component in a manner that is different from a manner for rendering a normal component. In such an embodiment, the abnormality of the electrical device may be caused by an abnormality of a certain component. The abnormal component is rendered in another manner, which can highlight the abnormal component and enable the user to more effectively locate the abnormal component.

In some embodiments, the method further includes: in response to that a maintenance operation performed by the first user on the abnormal component has been detected, determining a component action trajectory of the abnormal component under the maintenance operation; and in response to a determination that a deviation between the component action trajectory and a preset trajectory indicated by the maintenance plan is greater than a predetermined threshold, sending information which indicates a wrong operation. In some embodiments, the method further includes: in response to a determination that the deviation between the component action trajectory and the preset trajectory indicated by the maintenance plan is less than the predetermined threshold, sending information which indicates a correct operation. In such an embodiment, when the simulation operation of the user is wrong and is different from a preset operation of the maintenance plan, it is considered that the maintenance operation is wrong. Conversely, when the maintenance operation is consistent with the preset operation, it is considered that the maintenance operation is correct.

In some embodiments, the method further includes: sending the holographic image to a second display apparatus: receiving an operation indication from the second display apparatus, wherein the operation indicator is obtained by detecting an action of a second user of the second display apparatus using a second image capturing apparatus; and rendering the operation indication in the holographic image by using the first display apparatus. In such an embodiment, the user can send the holographic image and operation data of the electrical device of the factory to another remote user. After viewing the holographic image and the operation data through the mixed reality device, the another user can determine how to execute a next step according to the holographic image, and send the operation indication to an on-site user, thus achieving a remote operation guidance.

In some embodiments, the method further includes: obtaining, by using the first image capturing apparatus, a reality image of a space where the first user is located: establishing a three-dimensional space model of the space on the basis of the reality image, wherein the three-dimensional space model includes a three-dimensional device model of the electrical device in the space, and a position and direction of the three-dimensional device model correspond to an actual position and direction of the electrical device in the space: obtaining operation data of the electrical device; and rendering a holographic image by the three-dimensional space model and the operation data. In such embodiments, the mixed reality device also has a space perception ability, which can reconstruct a working environment around the user into a three-dimensional holographic image. In this way, the holographic image can be obtained more flexibly, making it easier for the user to present states of faulty electrical devices to other users.

In some embodiments, the method further includes: obtaining first posture information of the first user by using the first image capturing apparatus: receiving second posture information of the second user from the second image capturing apparatus, and determining a visual field of the first user on the basis of the first posture information: establishing a user model of the second user in the three-dimensional space model on the basis of the second posture information; and rendering the holographic image of the three-dimensional space model in the visual field by using the first display apparatus, wherein the holographic image includes a holographic image of the second user. In such an embodiment, the holographic image of the second user is added into the reconstructed user space, and the holographic image is rendered on the basis of the visual field of the first user, which can enable the first user and the second user to "be in" the same shared virtual space. By establishing real-time holographic images of users, a plurality of users can communicate with one another in a scene and directly watch operations of others. In this way, it is favorable for remote operation guidance and communication.

A second aspect of the present disclosure relates to an electronic device. The electronic device includes: at least one processor; and at least one memory, including instructions stored on the memory, wherein the instructions, when executed by the at least one processor, cause the at least one processor to perform the method for maintaining the electrical device in the factory according to the first aspect of the present disclosure.

A third aspect of the present disclosure relates to a computer-readable storage medium, storing instructions, wherein the instructions, when executed by the at least one processor, cause the at least one processor to perform the method for maintaining the electrical device in the factory according to the first aspect of the present disclosure.

BRIEF DESCRIPTION OF THE DRAWINGS

The aforementioned and other objectives, features, and advantages of the embodiments of the present disclosure will be more easily understood through the following detailed descriptions of the accompanying drawings. In the drawings, the multiple embodiments of the present disclosure will be explained by examples and nonrestrictive manners. In the drawings.

DETAILED DESCRIPTION OF EMBODIMENTS

The principle of the present disclosure will be explained now by referring to various exemplary embodiments shown in the accompanying drawings. It should be understood that the descriptions of these embodiments are only to enable those skilled in the art to better understand and further implement the present disclosure, and are not intended to limit the scope of the present disclosure in any way. It should be noted that similar or identical reference numerals can be used in the drawings where feasible, and similar or identical reference numerals can represent similar or identical functions. Those skilled in the art will easily recognize that alternative embodiments of structures and methods described herein can be adopted without departing from the principle of the present disclosure described herein in the following descriptions.

As used herein, the term "include" and its variants will be interpreted as an open-ended term that refers to "including but not limited to". The term "based on" will be interpreted as "at least partially based on". The term "one embodiment" or "an embodiment" should be understood as "at least one embodiment". The term "another embodiment" should be understood as "at least one embodiment". The terms "first", "second", and the like can refer to different or same objects. Other explicit and implicit definitions may also be included below. Unless otherwise explicitly stated in the context, definitions of terms are consistent throughout the entire specification.

As discussed above, energy consumption and assets in factory facilities need to be overall managed. In a conventional EAM software solution, a statistical dashboard, a maintenance scheduling tool, and a planning tool are provided for users. These solutions are designed to facilitate on-site operations and have the following common functions: data collection and displaying, calculation of key performance indicators, and prediction, such as power consumption prediction, maintenance prediction, and asset aging prediction.

However, in these solutions, the tools provided are implemented on a desktop device, a human-machine interface device, or a mobile device. Thus, the amount of information presented is limited, not rich enough. For example, a factory may include a plurality of substations distributed at different positions. When an electrical device in one substation fails, the two-dimensional presented information is not intuitive enough, making it difficult for operation and maintenance personnel to quickly locate the faulty electrical device. In addition, interactions with software are limited to a touch screen or a keyboard and mouse, making the interactions very inconvenient.

In view of this, the embodiments of the present disclosure provide a scheme for presenting electrical devices and corresponding operation data in a factory facility to users in a manner of holographic images by using a mixed reality device. Holographic images of the electrical devices are presented to a user through a display apparatus of the mixed reality device. Through interactions with the holographic images, the user can clearly and conveniently learn about operation states of all the electrical devices in the factory. Meanwhile, a result of an operation of the user is presented in the form of holographic images by using the mixed reality device, the user can intuitively learn about whether the operation is valid.

The holographic images based on mixed reality can reflect complex on-site information, allowing the user to know every detail of an electrified power distribution system, for example. The holographic images and corresponding digital information boards can present richer information, allowing the user to know complex key performance indicators through the holographic images, thereby helping the user make decisions.

Figure 1A:
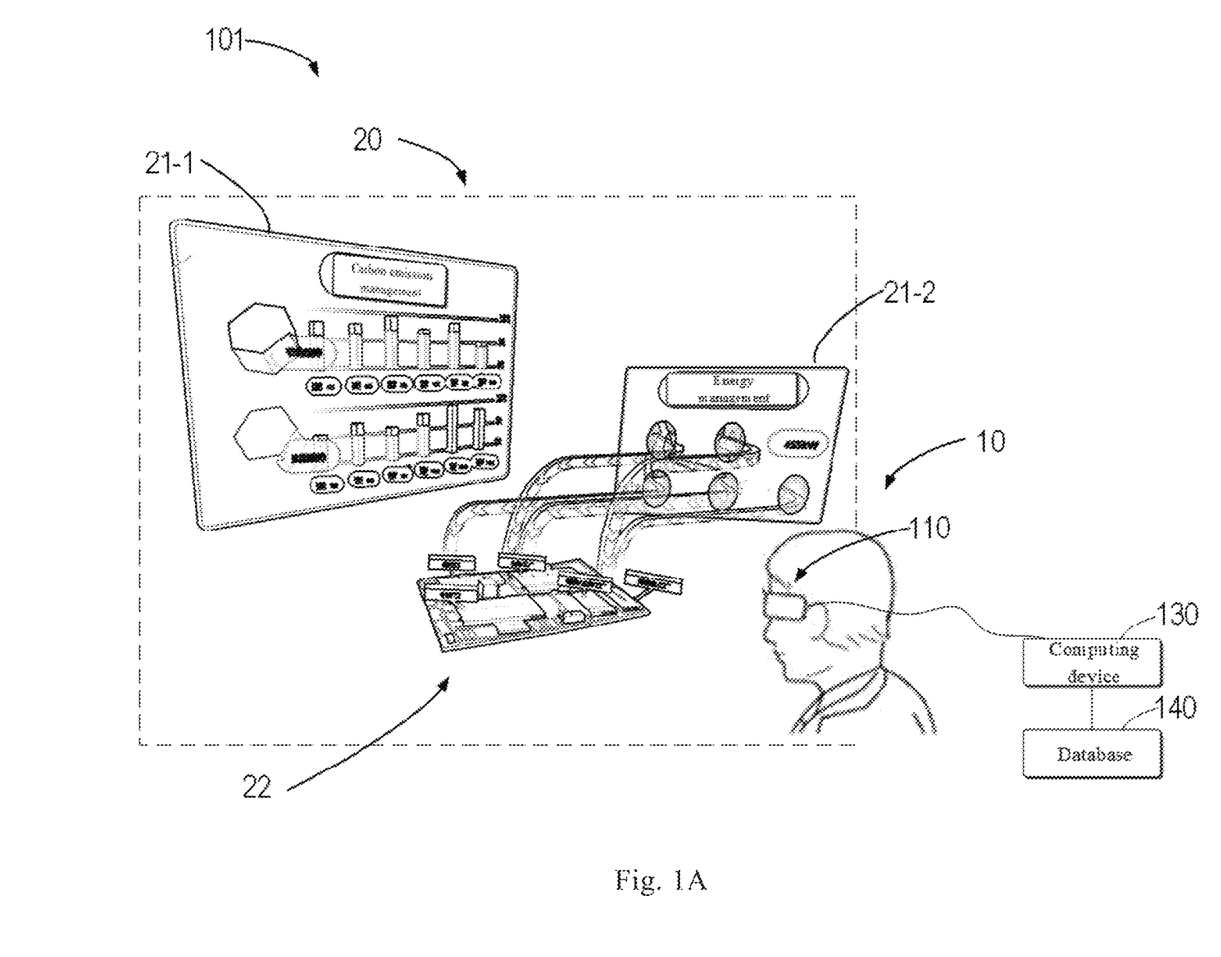
FIG. 1A shows a schematic diagram of an example environment where the embodiments according to the present disclosure can be implemented.

FIG. 1A shows a schematic diagram of an example environment 101 where the embodiments according to the present disclosure can be implemented. As shown in FIG. 1A, in the environment 101, a user 10 wears a mixed reality device 110. The mixed reality device 110 is connected to a computing device 130, and the computing device 130 is connected to an electrical device database 140. The computing device 130 can obtain all operation data of an electrical device in a factory facility and a three-dimensional model and digital model of the electrical device from the electrical device database 140. The computing device 130 can use the mixed reality device 110 to render the three-dimensional model of the electrical device in a display apparatus for presentation to the user 10. Meanwhile, the computing device 130 can also simulate the digital model of the electrical device using certain inputs, so as to obtain simulated data. It should be pointed out that the mixed reality device 110, the computing device 130, and the electrical device database 140 are all parts of an energy and electrical device management system 102 based on mixed reality. The energy and electrical device management system 102 will be described in detail later with reference to FIG. 1B.

In the embodiment shown in FIG. 1A, a holographic image 20 of an overview of the factory facility is rendered in the display apparatus of the mixed reality device 110. The holographic image 20 includes an information board 21 about an overall operation state of the factory facility and a holographic image 22 of the factory facility. The information board 21 about the operation state includes an information board 21-1 which presents carbon emission management information and an information board 21-2 which presents energy management information. An image capturing apparatus of the mixed reality device 110 can detect an action of the user 10, map the action of the user into the holographic image 20, and determine whether the action of the user 10 correspond to a preset operation action. When the action of the user 10 corresponds to the preset operation action, for example when the user 10 performs a "click" action, it can be determined that the user 10 has perform a "selection" action. For this operation, the mixed reality device 110 will present a selected relevant content.

Figure 1B:
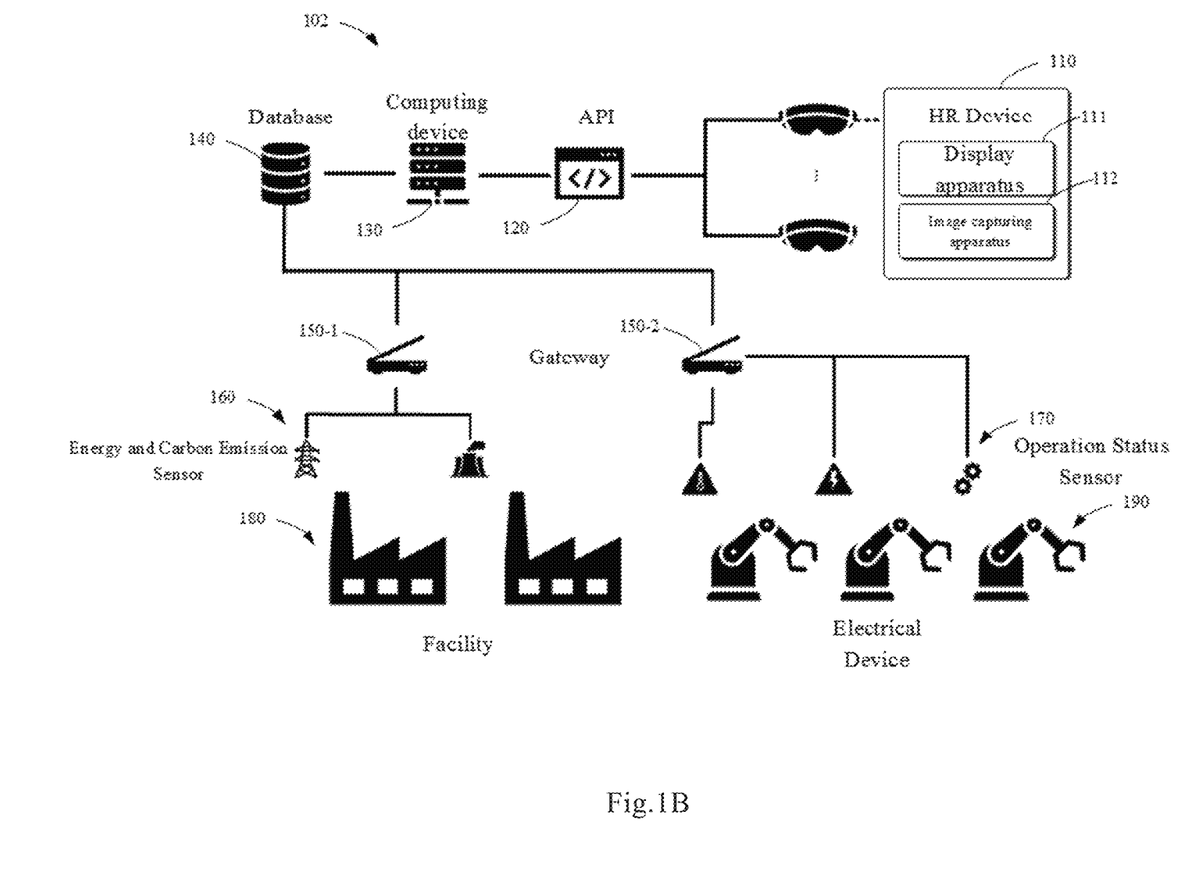
FIG. 1B shows a schematic diagram of an example system according to some embodiments of the present disclosure.

FIG. 1B shows a schematic diagram of an example system 102 according to some embodiments of the present disclosure. The system 102 includes a plurality of mixed reality devices 110 for users to wear. Each mixed reality device 110 includes a display apparatus 111 configured to render a holographic image or render a mixed image obtained by overlaying a holographic image on a real image, and an image capturing apparatus 112 configured to capture a real image of an environment where the mixed reality device 110 is located. The mixed reality device 110 is connected to a computing device 130 through an application program interface (API) 120. The computing device 130 can be a local computing device or a remote computing device, such as a cloud server. The computing device 130 is connected to an electrical device database 140 and can obtain all data about a factory facility from the electrical device database 140. The electrical device database 140 is connected to, for example, gateways 150-1 and 150-2. On the one hand, the electrical device database 140 is connected to an energy and carbon emission calculator 160 through the gateway 150-1. The energy and carbon emission calculator 160 can detect power consumption of a factory facility 180 and a carbon dioxide emission of the facility 180, and report detected data to the electrical device database 140. On the other hand, the electrical device database 140 is connected to an operation state sensor 170 through the gateway 150-2. An electrical device detection sensor 170 can detect operation data, such as power consumption, a temperature, and a working state, of an electrical device in a factory and report the detected data to the electrical device database 140.

An energy and electrical device management scheme assisted by the mixed reality device according to the present disclosure will be described and implemented in detail below with reference to FIG. 2 to FIG. 5B.

Figure 2:
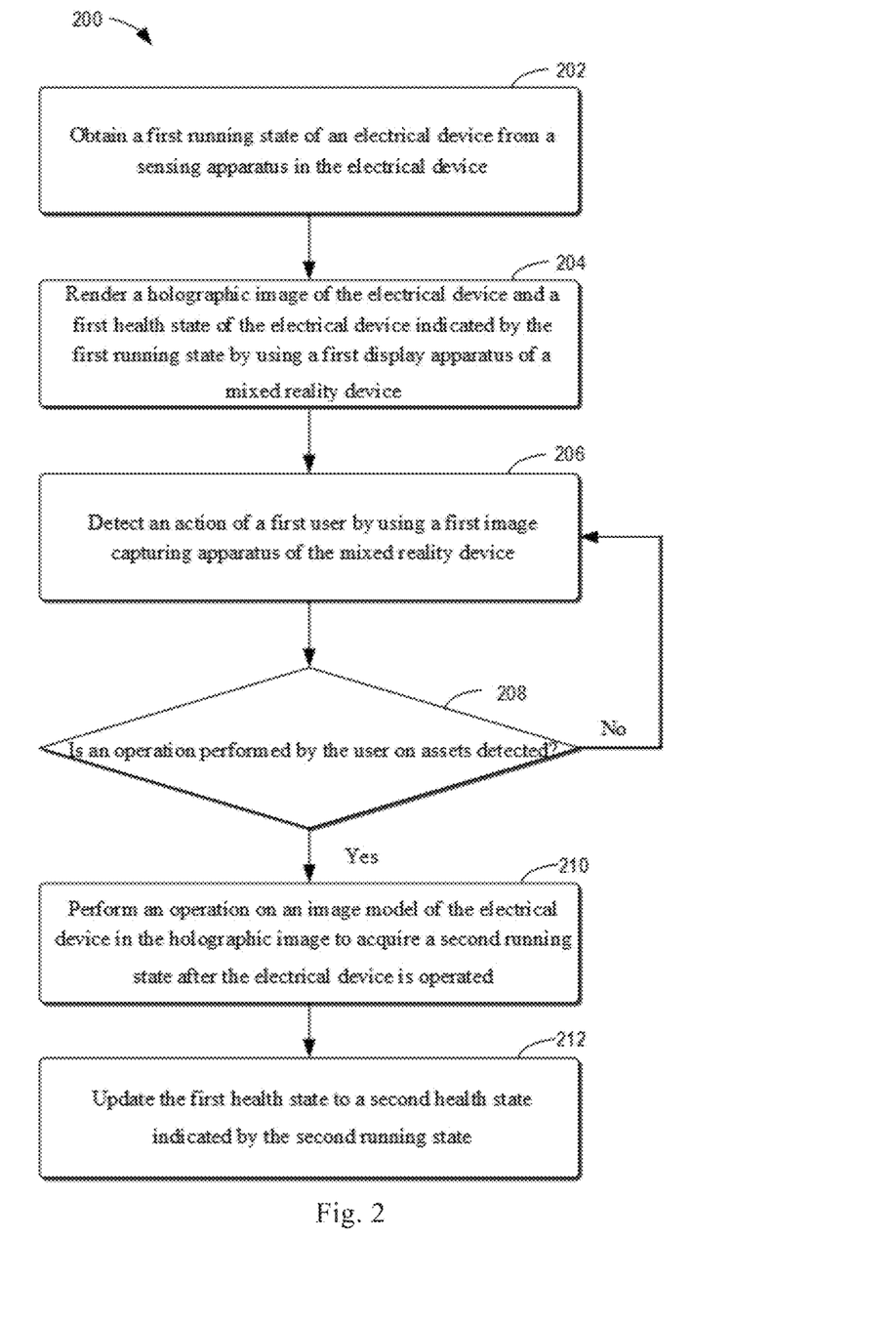
FIG. 2 shows a flowchart of an example method for maintaining an electrical device in a factory according to an embodiment of the present disclosure.

FIG. 2 shows a flowchart of an example method 200 for maintaining an electrical device in a factory according to an embodiment of the present disclosure. The method 200 can be performed, for example, by the computing device 130 in FIG. 1A.

At 202, the computing device 130 obtains a first operation state of the electrical device from a sensing apparatus in the electrical device. Due to an inherent nature of the electrical device, various sensors configured to monitor the operation state of the electrical device are arranged inside the electrical device, such as the operation state sensor 170 in FIG. 1B.

At 204, the computing device 130 renders a holographic image of the electrical device and a first health state of the electrical device indicated by the first operation state by using a first display apparatus of a mixed reality device. The computing device 130 can send an instruction to the mixed reality device 110 connected to the computing device to enable the mixed reality device to render the holographic image of the electrical device in the factory. The health state can be a related operation state parameter or can be an evaluation value that integrates all operation state parameters. Although the holographic image is described here, it should be understood that the mixed reality device 110 can also render a mixed image obtained by overlaying a holographic image on a displayed image, wherein the holographic image is a part of the rendered image.

In some embodiments, the computing device 130 can obtain three-dimensional models and real-time operation data of all electrical devices in the factory from the electrical device databases 140. Afterwards, the computing device 130 renders an accurate image model of the electrical device in the holographic image according to information of the three-dimensional model and the operation data by using the display apparatus 111. The operation data can be obtained in real time by the sensors in the factory facility, or can be obtained by simulating the digital model of the electrical device on the basis of the detected data.

In some embodiments, the operation data can be presented in the form of a digital dashboard. The digital dashboard includes three-dimensional visualization that reflects flowing of energy between the electrical devices in the factory, carbon emissions/quotas, and health states of the electrical devices. Information presented in the holographic image aims to improve the ability of the user to understand on-site operation and maintenance of the factory facility. An action (such as a motion of a hand, touch by a hand, a physical posture, and eye fixation) of a user can be used for directly interacting with the digital dashboard based on mixed reality, thereby improving the interaction efficiency.

At 206, the computing device 130 detects an action of a user by using the image capturing apparatus 112 of the mixed reality device 110. The computing device 130 may, for example, send an image capturing command to the image capturing apparatus 112 of the mixed reality device 110 to enable the image capturing apparatus to detect in real time the action of a wearer, namely; the user (also referred to as a first user), of the mixed reality device 110.

At 208, the computing device 130 determines whether an operation performed by the user on the electrical device has been detected. For example, the computing device 130 can map the action of the user into a virtual space where the holographic image is located, determine, according to a coordinate of the action of the user, whether the user performs an operation on the electrical device, and confirm, through a motion trajectory, a type of the operation that has been performed. If the computing device 130 has detected the operation performed by the user on the electrical device, 208 of the method 200 will be executed, otherwise, 204 will be continued to be executed for detection.

At 210, the computing device 130 performs an operation on an image model of the electrical device in the holographic image to obtain a second operation state after the electrical device is operated. The computing device 130 can generate an operation instruction upon detecting the operation of the user, perform an operation action on the image model of the corresponding electrical device in the holographic image, and determine, by simulating the digital model of the electrical device, the operation state of the electrical device after the electrical device is operated.

At 212, the computing device 130 updates the first health state to a second health state indicated by the second operation state. Therefore, the computing device 130 presents a simulation result after performing the operation on the electrical device to the user.

In a conventional two-dimensional display scheme, a displayed content is limited to an abstract representation of a position of the electrical device in the facility. In addition, monitored information is usually presented in a table or graphical form. These presentation forms will usually weaken relationships between the electrical devices and make monitoring and maintenance become two separate parts of on-site operations. What is different is that the information expression amount is increased by using three-dimensional holographic image displaying according to this embodiment. The user can not only quickly access digital information, but also quickly access physical and directional information, thereby improving the efficiency of on-site management.

Figure 3:
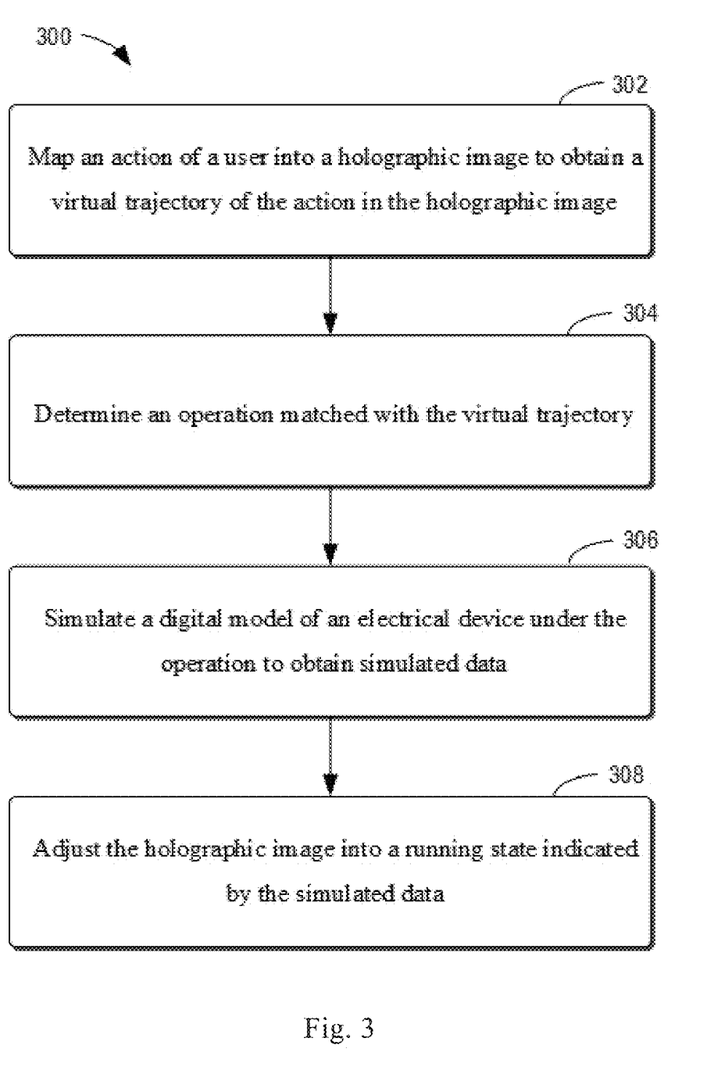
FIG. 3 shows a flowchart of an example method for performing an operation on an image model according to an embodiment of the present disclosure.

FIG. 3 shows a flowchart of an example method 300 for performing an operation on an image model according to an embodiment of the present disclosure. The method 300 can be performed, for example, by the computing device 130 in FIG. 1A.

At 302, the computing device 130 maps the action of the user into the holographic image to obtain a virtual trajectory of the action in the holographic image. The computing device 130 can recognize, for example, key body points, such as various joints of a hand, of the user in a series of image frames obtained by the image capturing apparatus 112 of the mixed reality device 110. In an initialization stage, the computing device 130 can calibrate coordinates of the key body points of the user with a virtual space where a holographic image to be generated is located, so as to determine initial positions of the key body points of the user in the virtual space. In an operation stage, the computing device 130 can map real coordinates of the key body points into the virtual space and can determine the virtual trajectory of the action according to the coordinate of the action in the virtual space.

At 304, the computing device 130 determines an operation matched with the virtual trajectory: The computing device 130 can compare the determined virtual trajectory with a preset operation trajectory. The operation trajectory can be a grasping action formed by bending fingers, or a movement action formed by a movement of a hand during grasping. When a deviation between the virtual trajectory and the operation trajectory is less than a predetermined threshold, it is considered that the virtual trajectory is matched with the operation trajectory.

At 306, the computing device 130 simulates a digital model of the electrical device under the operation to obtain simulated data. After confirming a content of the operation, the computing device 130 can simulate the digital model of the electrical device by taking the content as an input and obtain the simulated operation data of the digital model.

At 308, the computing device 130 adjusts the holographic image into the operation state indicated by the simulated data. The simulated data (also referred to as predicted data) can include operation data such as a position, direction, geometric dimension, and energy consumption of the electrical device after simulation. The computing device 130 adjusts the holographic image according to the simulated data to make the holographic image matched with a simulation result, so that the simulation result can be presented to the user intuitively.

In this way, the simulation performed by the user on the electrical device is achieved. Simulation aims to help a user understand energy/asset management before practical operations. By creating a digital copy, namely, the digital model, of the operable electrical device (such as a switchgear panel, a permission power distribution system control, and a transformer) and capturing a hand motion using the image capturing apparatus 112, the user can directly interact with the image model of the electrical device and obtain important information about energy and electrical device management through the simulation performed on the digital model.

Figure 4A:
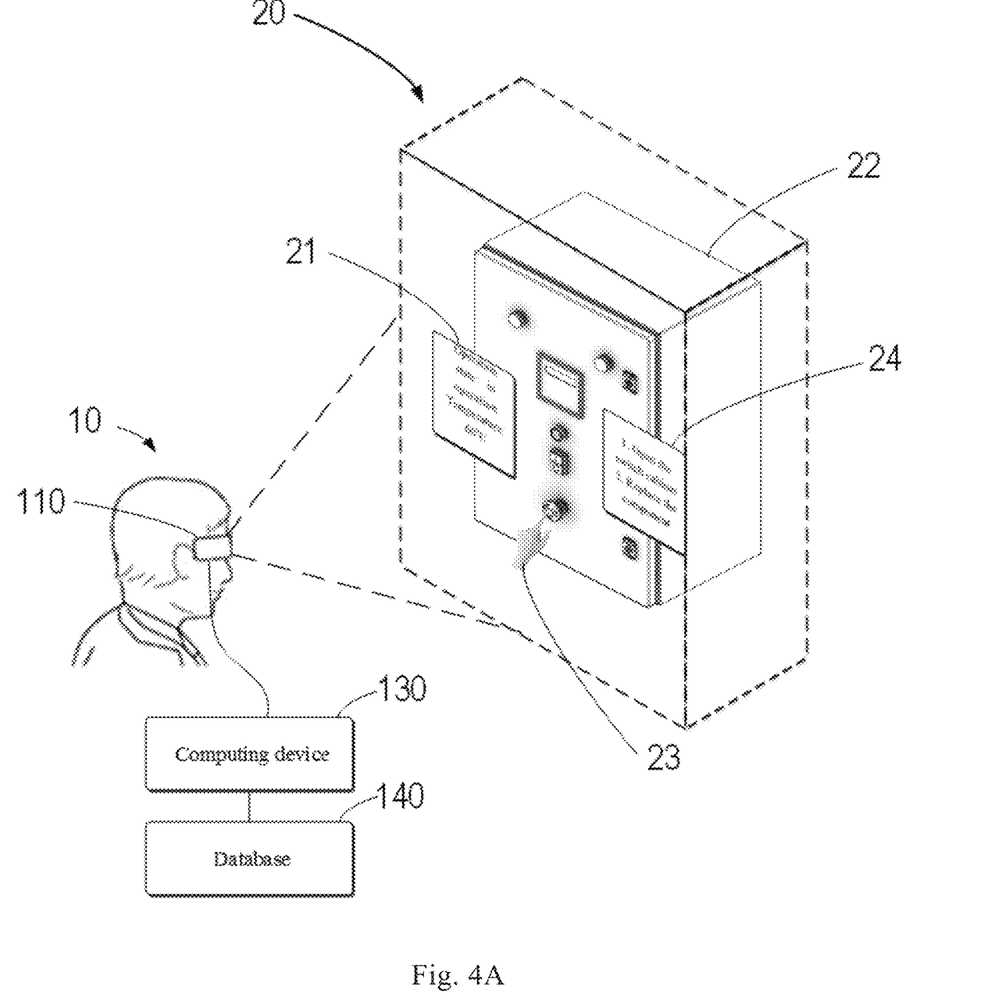
FIG. 4A to FIG. 4B show schematic diagrams of a simulated maintenance operation according to an embodiment of the present disclosure.
Figure 4B:
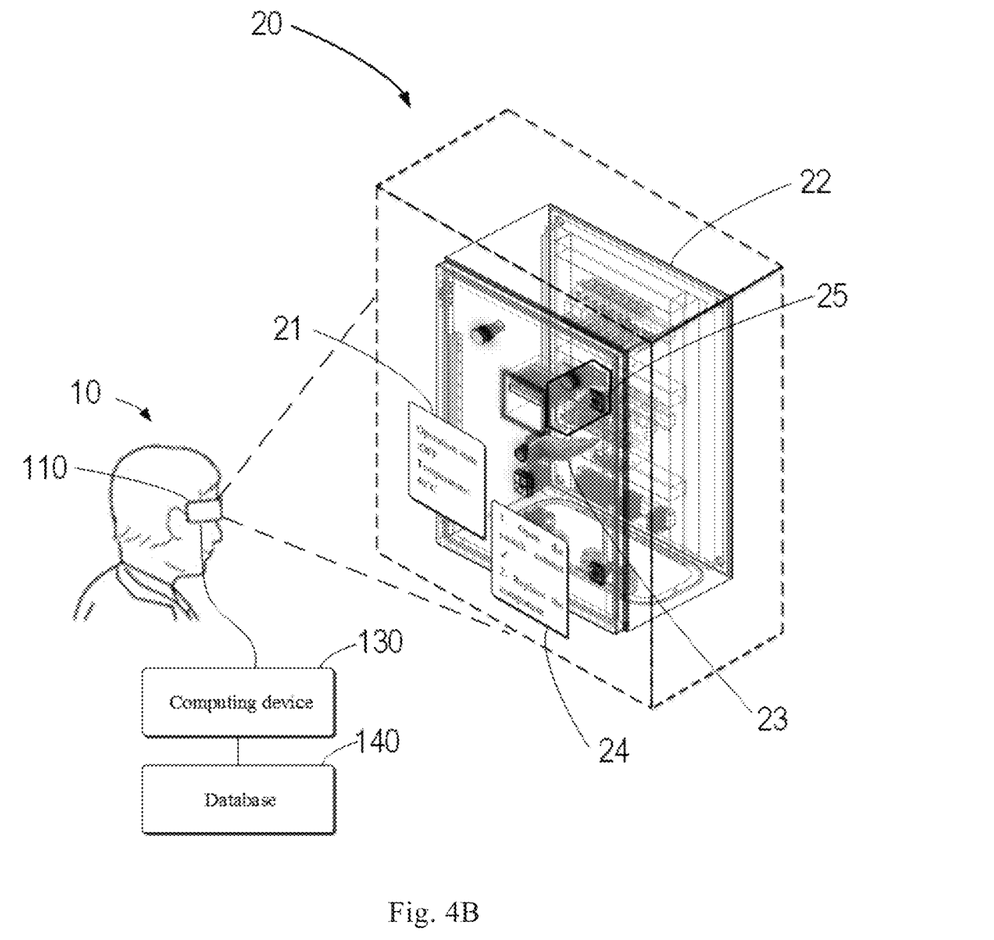

FIG. 4A to FIG. 4B show schematic diagrams of a simulated maintenance operation according to an embodiment of the present disclosure. According to the embodiments of the present disclosure, in a case that a user performs an intervention operation on an electrical device or an energy system, the user can do practice using a system based on mixed reality before practical operations. For example, the computing device 130 can control the display apparatus 111 of the mixed reality device 110 to render a predetermined holographic environment. Afterwards, the image capturing apparatus 112 of the mixed reality device 110 detects action inputs of the user and responds to these inputs. Thus, it is possible to train the user on operation and maintenance of the electrical device. Energy management and carbon emission planning can also be simulated using the device of the present disclosure.

As shown in FIG. 4A, for example, when the user 10 views an overview of factory settings, an electrical device has an abnormality. The computing device 130 can generate prompt information which indicates the abnormality and instruct the display apparatus 111 of the mixed reality device 110 to render the prompt information in a holographic image. When the user reads the prompt information of the abnormality of the electrical device, the user 10 performs a selection operation on the prompt information. In this embodiment, the electrical device having the abnormality is a switch cabinet. After receiving the operation of the user 10, the computing device 130 instructs the display apparatus 111 to render a holographic image 20. The holographic image 20 includes a digital information board 21 which presents operation data associated with the abnormality: an electrical device holographic image 22 of the abnormal switch cabinet, a hand-form operation indication 23, and a maintenance plan 24 for the abnormality. Therefore, when there is an electrical device in the factory having a failure or an abnormality, the user can immediately locate the abnormal electrical device.

The digital information board 21 displays that the operation state of the switch cabinet is ON and a temperature of the switch cabinet is 60° C. Thus, it can be determined that a failure of a component in the switch cabinet causes an abnormal temperature. To this end, the maintenance plan 24 includes: 1. Open the switch cabinet: 2. Replace the component. The operation indication 23 corresponding to the maintenance plan 24 instructs the user to click on an ON/OFF button of the switch cabinet to power off the switch cabinet, so that the user can open the switch cabinet after the switch cabinet is powered off. After reading the plan, the user takes an action to click on a button in the holographic image. Since the operation conforms to the maintenance plan 24, the computing device 130 performs a power-off operation.

The operation mode of the electrical device can be specifically set according to an actual need. For example, a switch cabinet usually has a five-prevention linkage mechanism to ensure that a cabinet door can only be opened in the event of a complete power outage. However, the five-prevention linkage mechanism can be specifically customized by a supplier, so operation and maintenance personnel may not be proficient in opening the cabinet door. In this case, the maintenance plan can also include a holographic image demonstration of a detailed process of opening a cabinet door. Thus, the operation and maintenance personnel can open the cabinet door by imitating the holographic image demonstration.

In some embodiments, the computing device 130 can determine whether the operation performed on the electrical device can be achieved through an electric actuating mechanism. For example, switching on and switching off of some switch cabinets and shaking in and out of components in the switch cabinets can be achieved through an electric mechanism. In the embodiment shown in FIG. 4A, the computing device 130 can determine that a power-off operation can be achieved through the electric actuating mechanism. Therefore, the computing device 130 generates and sends a power-off operation instruction to the actuating mechanism to power off the corresponding switch cabinets in reality.

As shown in FIG. 4B, after the user 10 opens the switch cabinet in the holographic image, the display apparatus renders an internal structure of the switch cabinet. In this case, the digital information board 21 displays that the operation state of the switch cabinet is OFF and a temperature of the switch cabinet is 40° ° C. In addition, the contour of the abnormal component, causing the abnormality, in the electrical device is bolded to distinguish the abnormal component from other normal components. Correspondingly to the current situation, step 1 of opening the switch cabinet in the maintenance plan 24 is marked as being completed by in the form of check. Meanwhile, the operation indication 23 becomes a gesture of moving the abnormal component 25. Afterwards, the user 10 can perform simulation in the holographic image to confirm whether the operation is correct.

In some embodiments, the computing device 130 can determine a component action trajectory of the abnormal component under the maintenance operation, and send, when it is determined that a deviation between the component action trajectory and a preset trajectory indicated by the maintenance plan is greater than a predetermined threshold, information which indicates a wrong operation. Correspondingly, the computer device 130 can send, when it is determined that the deviation between the component action trajectory and the preset trajectory indicated by the maintenance plan is less than the predetermined threshold, information which indicates a correct operation.

In general, when the electrical device has an abnormality, the maintenance personnel may personally inspect the electrical device, which may pose a risk of personal injury. The mixed reality devices have a certain environmental perception capability. When a user gets close to a potential risk, the mixed reality device can send a warning signal to the user. When the user performs an operation on a certain electrical device, the mixed reality device can detect the operation/ electrical device and automatically display information to the user if needed. Therefore, the risk of personal injury can be significantly reduced.

FIG. 5A to FIG. 5D show schematic diagrams of a remote operation guidance according to an embodiment of the present disclosure. According to the embodiments of the present disclosure, when a user requires remote assistance from a product expert to operate some electrical device, the expert can also wear a mixed reality device and view a scene provided by the user. There are two ways to accept suggestions of the expert. The first way is video call. The user will obtain an image from the mixed reality device and send the image to the expert. The expert will chat with the user through a video call and observe, through the mixed reality device worn by the expert, a content watched by the user. The expert can perform virtual annotations in videos to convey a handling plan to the user. The second way is virtual transfer. In virtual transfer, the user first uses the mixed reality device (or an independent 3D model reconstruction apparatus) to scan the environment. Afterwards, the user reconstructs a three-dimensional holographic image using a scanned environment image and shares the three-dimensional holographic image with the expert through a network. The expert can be "transferred" to the position of the user through the mixed reality devices. After being transferred, the expert can coexist with the user in a virtual form in a virtual user environment. In this case, the expert can guide the user to complete a series of electrical device operations.

Figure 5A:
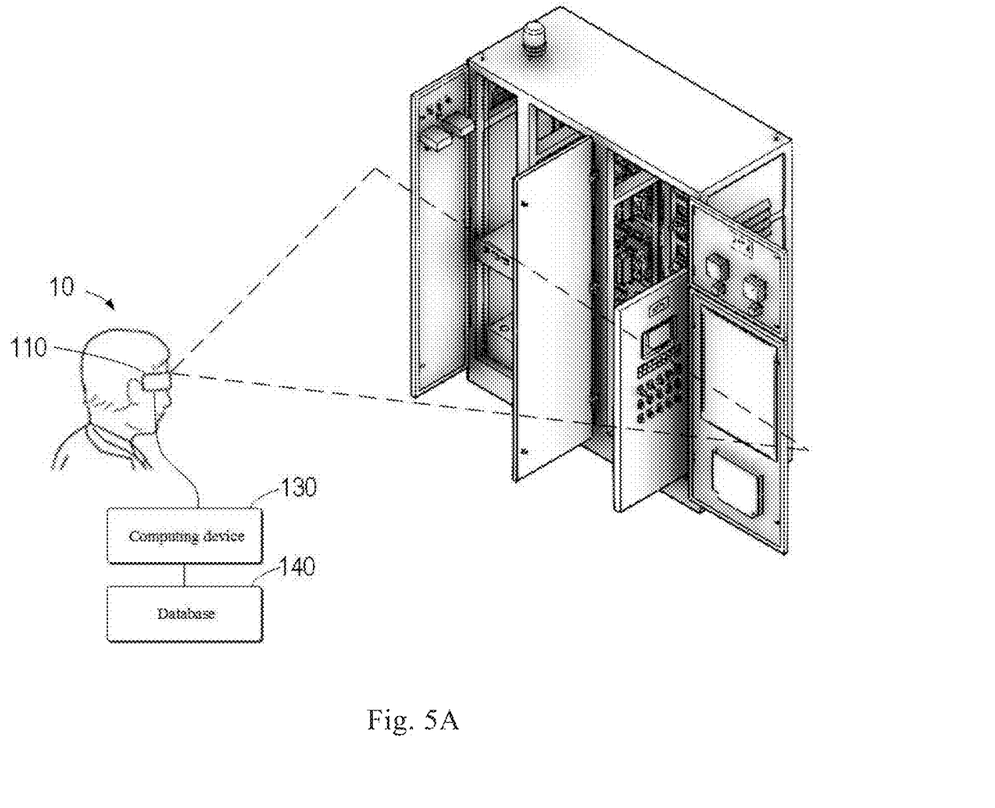
FIG. 5A to FIG. 5D show schematic diagrams of a remote operation guidance according to an embodiment of the present disclosure.

FIG. 5A shows a schematic diagram of a space that the user scans. As shown in FIG. 5A, when the user 10 finds that an electrical device has an abnormality, the user 10 uses the image capturing apparatus 112 of the mixed reality device 110 to scan real images of electrical devices located nearby. Afterwards, the computing device 130 can reconstruct, on the basis of the captured real images, a three-dimensional space model of a space where the user 10 is located. The three-dimensional space model includes three-dimensional models of all objects, particular the electrical devices, in the space, and a position and direction of each three-dimensional device model in the three-dimensional space model correspond to an actual position and direction of the electrical device in the space. The computing device 130 can also identify the electrical devices in the real images according to pre-stored electrical device information (such as the positions, model numbers, and the like of the electrical devices), and obtain operation data of the electrical devices. Finally, the computing device 130 instructs the display apparatus of the mixed reality device 110 to render a holographic image 20 according to the three-dimensional space model and the operation data. The holographic image 20 includes device holographic images 21 of the electrical devices.

Figure 5B:
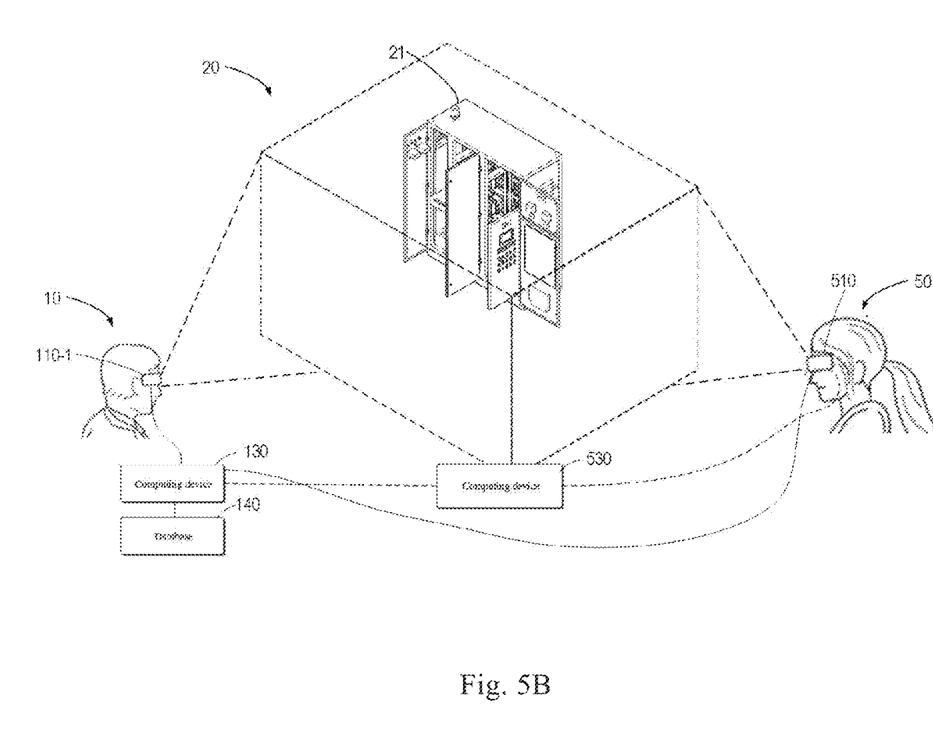

FIG. 5B shows a schematic diagram of a space shared by the user. As shown in FIG. 5B, after the holographic image is rendered, the computing device 130 connected to the mixed reality device 110 worn by the user 10 (also referred to as a first user) can send the holographic image 20 to the mixed reality device 510 worn by expert 50 (also referred to as a second user) to cause the display apparatus of the mixed reality device 510 to render the received holographic image. The mixed reality device 510 can be a device connected to the computing device 130 or a device connected to a local computing device 530 of the expert. Thus, the user 10 shares, with the expert 50, the holographic image of the environment where the user is located, so that the expert 50 clearly learns about operation conditions of the electrical devices through the device holographic image 21 of the electrical devices.

Figure 5C:
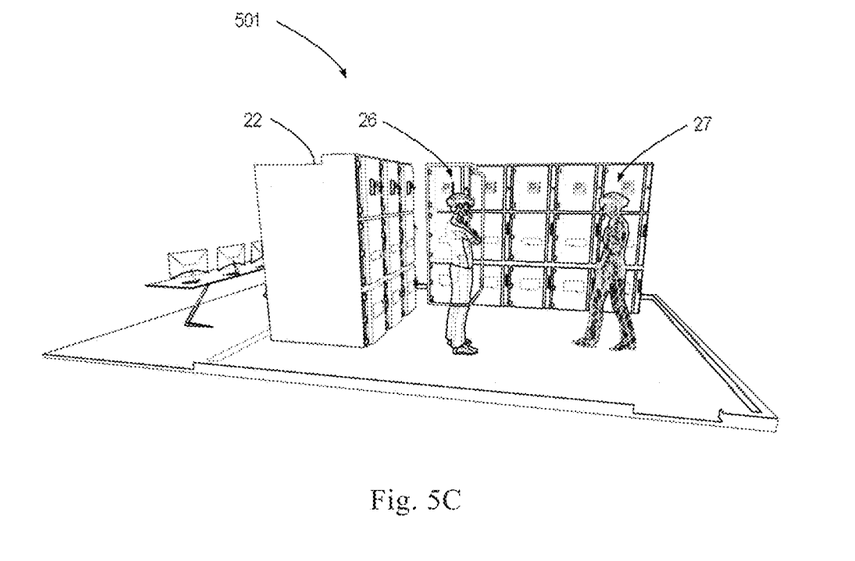

FIG. 5C shows a schematic diagram of a holographic image 501 displayed by the display apparatus of the user 10 during remote operation guidance. The computing device 130 can instruct the display apparatus of the mixed reality device 110 to render the expert 50 in a space holographic image and render a holographic image according to a visual field of the user 10. The computing device 130 obtains first posture information of the user 10 by using the image capturing apparatus of the mixed reality device 110, and estimates a real visual field of the user 10 on the basis of the first posture information, so as to determine a scene which should be seen by the user 10, of the environment where the user 10 is located. Meanwhile, the computing device 130 receives second posture information of the expert 50 from the image capturing apparatus of the mixed reality device 510, and establishes a user model of the expert 50 in the three-dimensional space model on the basis of the second posture information. The second posture information can include a height, posture, and positioning information in the space of the expert 50, and the positioning information of the expert 50 can be customized, and movement of a holographic image of the expert in the space holographic image can be achieved by walking. Finally, the computing device 130 renders a holographic image of the three-dimensional space model by using the display apparatus of the mixed reality device 110. The holographic image includes the holographic image of the user 10 and the holographic image of the expert 50. As shown in FIG. 5C, the holographic image 501 includes the holographic image 26 of the user 10 and the holographic image 27 of the expert 50. Due to the fact that the expert 50 is not actually in the space where the user 10 is located, the holographic image 27 of the expert 50 is rendered in a different manner that is different from a rendering manner of the electrical device in the environment where the user 10 is located.

Figure 5D:
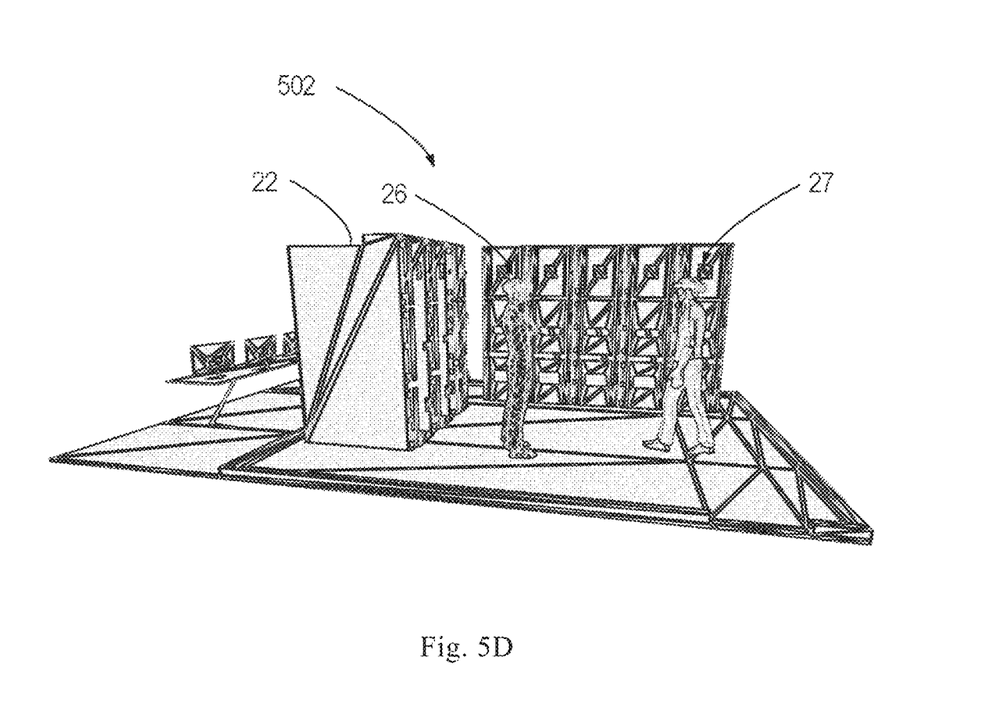

FIG. 5D shows a schematic diagram of a holographic image 502 displayed by the display apparatus of the expert 50 during remote operation guidance. The display apparatus of the mixed reality device 510 renders a holographic image of the three-dimensional model of the space where the expert 50 is located. As the reconstructed spaces are all virtual to the expert 50, in contrast to the holographic image shown in FIG. 5C, the holographic image 26 of the user 10 and a holographic image 22 of an object in the environment where the user 10 is located are rendered in a different rendering manner. Thus, scenes that are imitated from those respectively seen by the user 10 and the expert 50 in their real spaces are presented to the user and the expert 50, and virtual transfer from the expert 50 to the environment where the user is located is achieved. In the same virtual space, the user 10 and the expert 50 can communicate with each other through body languages. Additional information (such as the 3D models of the electrical devices) can also be introduced into the shared environment. For example, the expert 50 can select to project the 3D models of the electrical devices into the holographic space of the user and explain how to interact with the electrical devices by manipulating the 3D models. In this way, the efficiency of remote guidance is improved.

Figure 6:
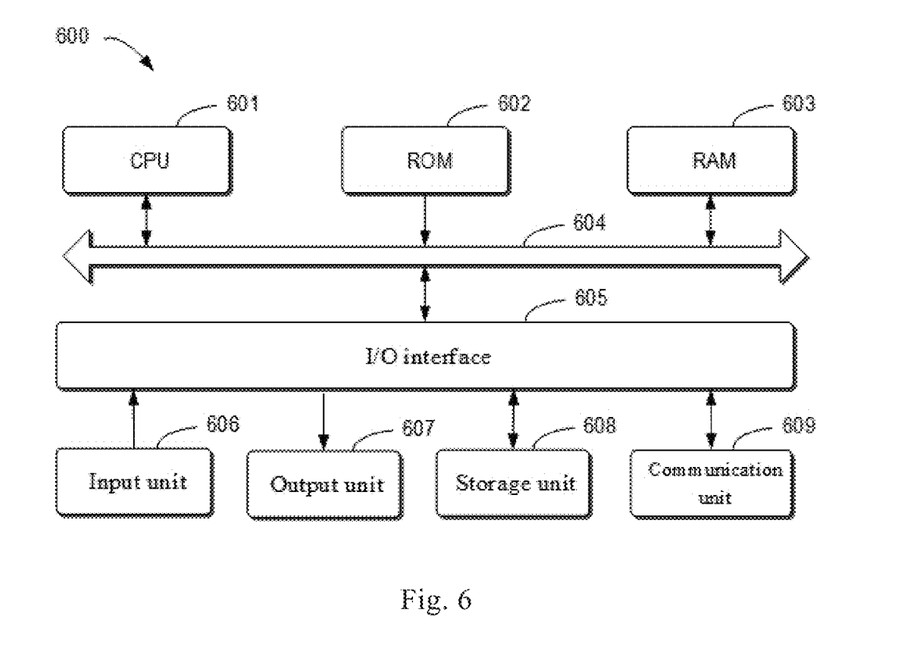
FIG. 6 shows a schematic block diagram of an example device configured to implement an embodiment of the present disclosure.

FIG. 6 shows a schematic block diagram of an example device 600 configured to implement an embodiment of the present disclosure. As shown in FIG. 6, the device 600 may include a central processing unit (CPU) 601 serving as a processor that can perform various appropriate actions and processing according to computer program instructions stored in a Read-Only Memory (ROM) 602 or loaded from a storage unit 608 to a Random Access Memory (RAM) 603. For example, the ROM 602, the RAM 603, or the storage unit 608 serving as a memory stores instructions, when executed by the processor, causing the device 600 to perform the method for detecting a state of a line of an electrical device according to the embodiments of the present disclosure. The RAM 603 can also store various programs and data required for operations of the electronic device 600. The CPU 601, the ROM 602, and the RAM 603 are connected to each other through a bus 604. An Input/Output (I/O) interface 605 is also connected to the bus 604.

Multiple components in the device 600 are connected to the I/O interface 605, including: an input unit 606: an output unit 607, such as various types of displays and speakers; the storage unit 608, such as a magnetic disk; and a communication unit 609, such as a network card, a modem, and a wireless communication transceiver. The communication unit 609 allows the device 600 to exchange information/data with other devices via a computer network, such as the Internet, and/or various telecommunication networks.

The processing unit 601 may perform the various methods and processing described above, such as method 200 or method 300. For example, in some embodiments, the methods 200 and 300 may be implemented as a computer software program that is tangibly included in a machine-readable medium such as the storage unit 608. In some embodiments, part of or all computer programs may be loaded and/or installed onto the device 600 via the ROM 602 and/or the communication unit 609. One or more steps of the method 200 described above may be performed when the computer program is loaded into the RAM 603 and executed by the CPU 601. Alternatively, in other embodiments, the CPU 601 may be configured to perform the method 200 and the method 300 in any other suitable manners (such as by means of firmware).

The functions described herein above may be performed, at least in part, by one or a plurality of hardware logic components. For example, nonrestrictively, example hardware logic components that can be used include: a Field Programmable Gate Array (FPGA), an Application Specific Integrated Circuit (ASIC), Application Specific Standard Parts (ASSP), a System on Chip (SOC), a Complex Programmable Logic Device (CPLD), and the like.

Program code for implementing the method of the present disclosure may be written by using one programming language or any combination of a plurality of programming languages. These program codes may be provided to a processor or controller of a general-purpose computer, a special purpose computer, or another programmable data processing apparatus, so that the program codes, when executed by the processor or controller, implement the functions/operations specified in the flowcharts and/or block diagrams. The program codes may be executed entirely on a machine partly on a machine, executed, as a stand-alone software package, partly on a machine and partly on a remote machine, or executed entirely on a remote machine or a server.

In the context of the present disclosure, a machine-readable medium may be a tangible medium that may include or store a program for use by an instruction execution system, apparatus, or device or in connection with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the above content. More specific examples of the machine-readable medium may include an electrical connection based on one or more wires, a portable computer disk, a hard disk drive, a RAM, a ROM, an EPROM or flash memory, an optical fiber, a CD-ROM, an optical storage device, a magnetic storage device, or any suitable combinations of the above contents.

In addition, although various operations are depicted in a specific order, this should be understood as requiring these operations to be executed in the specific order shown or in a sequential order, or requiring that operations shown in all the figures should be executed to achieve desired results. In certain environments, multitasking and parallel processing may be advantageous. Similarly, although several specific implementation details are included in the above discussion, these should not be interpreted as limiting the scope of the present disclosure. Some features described in the context of the individual embodiments can also be combined and implemented in a single implementation. On the contrary, various features that are described in the context of the single implementation may also be implemented in a plurality of implementations separately or in any suitable sub-combinations.

Although the subject matter has been described in a language specific to structural features and/or method logical actions, it should be understood that the subject matter limited in the attached claims may not necessarily be limited to the specific features or actions described above. On the contrary, the specific features and actions described above are only exemplary forms for implementing the claims.

We claim:

1. A method for monitoring and maintaining a health state of an electrical device, comprising:
    obtaining a first operation state of the electrical device from a sensing apparatus in the electrical device;
    rendering a holographic image of the electrical device and a first health state of the electrical device indicated by the first operation state by using a first display apparatus of a mixed reality device;
    detecting an action of a first user by using a first image capturing apparatus of the mixed reality device;
    determining whether a first operation was performed by the first user on the holographic image of the electrical device, based on the action of the first user;
    performing the first operation on an image model of the electrical device in the holographic image of the electrical device to obtain a second operation state;
    updating the first health state to a second health state indicated by the second operation state;
    in response to a determination that the electrical device has an abnormality, generating prompt information which indicates the abnormality;
    rendering the prompt information in the holographic image of the electrical device; and
    in response to that a selection operation performed by the first user on the prompt information has been detected, rendering, in the holographic image of the electrical device, the electrical device having the abnormality and operation data associated with the abnormality,
   wherein the rendering the electrical device having the abnormality and the operation data associated with the abnormality comprises:
      determining an abnormal component, causing the abnormality, in the electrical device;
      rendering a maintenance plan for the abnormal component in the holographic image of the electrical device; and
      rendering the abnormal component in a manner that is different from a manner for rendering a normal component;
   in response to that a maintenance operation performed by the first user on the abnormal component has been detected, determining a component action trajectory of the abnormal component under the maintenance operation; and
   in response to a determination that a deviation between the component action trajectory and a preset trajectory indicated by the maintenance plan is greater than a predetermined threshold, sending information which indicates a wrong operation.

2. The method according to claim 1 further comprising:
   mapping the action of the first user into the holographic image of the electrical device to obtain a virtual trajectory of the action in the holographic image of the electrical device;
   determining the first operation matched with the virtual trajectory;
   simulating a digital model of the electrical device under the first operation to obtain simulated data; and
   adjusting the holographic image of the electrical device into the second operation state indicated by the simulated data.

3. The method according to claim 2, further comprising:
   in response to a determination that the first operation comprises an operation performed on an actuating mechanism of the holographic image of the electrical device, generating an operating instruction; and
   sending the operating instruction to the actuating mechanism, so that the actuating mechanism executes the operating instruction.

4. The method according to claim 1, further comprising:
   in response to a determination that the deviation between the component action trajectory and the preset trajectory indicated by the maintenance plan is less than the predetermined threshold, sending information which indicates a correct operation.

5. The method according to claim 1, further comprising:
   sending the holographic image of the electrical device to a second display apparatus;
   receiving an operation indication from the second display apparatus, wherein the operation indication is obtained by detecting an action of a second user of the second display apparatus using a second image capturing apparatus; and
   rendering the operation indication in the holographic image of the electrical device by using the first display apparatus.

6. The method according to claim 5, further comprising:
   obtaining, by using the first image capturing apparatus, a reality image of a space where the first user is located;
   establishing a three-dimensional space model of the space on a basis of the reality image,
      wherein the three-dimensional space model comprises a three-dimensional device model of the electrical device in the space, and
         wherein a position and direction of the three-dimensional device model correspond to an actual position and direction of the electrical device in the space;
   obtaining operation data of the electrical device; and
   rendering a holographic image of the space by the three-dimensional space model and the operation data of the electrical device.

7. The method according to claim 6, further comprising:
   obtaining first posture information of the first user by using the first image capturing apparatus;
   receiving second posture information of the second user from the second image capturing apparatus, and determining a visual field of the first user on the basis of the first posture information;
   establishing a user model of the second user in the three-dimensional space model on the basis of the second posture information; and
   rendering the holographic image of the space in the visual field by using the first display apparatus, wherein the holographic image of the space comprises a holographic image of the second user.

8. An electronic device, comprising:
   at least one processor; and
   at least one memory, comprising instructions stored on the memory, wherein the instructions, when executed by the at least one processor, cause the at least one processor to perform the method according to claim 1.

9. The electronic device according to claim 8 further comprising:
   mapping the action of the first user into the holographic image of the electrical device to obtain a virtual trajectory of the action in the holographic image of the electrical device;
   determining the first operation matched with the virtual trajectory;
   simulating a digital model of the electrical device under the first operation to obtain simulated data; and
   adjusting the holographic image of the electrical device into the second operation state indicated by the simulated data.

10. The electronic device according to claim 9, wherein the method further comprises:
   in response to a determination that the first operation comprises an operation performed on an actuating mechanism of the holographic image of the electrical device, generating an operating instruction; and
   sending the operating instruction to the actuating mechanism, so that the actuating mechanism executes the operating instruction.

11. The electronic device according to claim 8, wherein the method further comprises:
   sending the holographic image of the electrical device to a second display apparatus;
   receiving an operation indication from the second display apparatus, wherein the operation indication is obtained by detecting an action of a second user of the second display apparatus using a second image capturing apparatus; and
   rendering the operation indication in the holographic image of the electrical device by using the first display apparatus.

12. A non-transitory computer-readable storage medium, storing instructions, wherein the instructions, when executed by at least one processor, cause the at least one processor to perform the method according to claim 1.

13. The non-transitory computer-readable storage medium according to claim 12, wherein the method further comprises:

mapping the action of the first user into the holographic image of the electrical device to obtain a virtual trajectory of the action in the holographic image of the electrical device;

determining the first operation matched with the virtual trajectory;

simulating a digital model of the electrical device under the first operation to obtain simulated data; and adjusting the holographic image of the electrical device into the second operation state indicated by the simulated data.

14. The non-transitory computer-readable storage medium according to claim 13, wherein the method further comprises:

in response to a determination that the first operation comprises an operation performed on an actuating mechanism of the holographic image of the electrical device, generating an operating instruction; and sending the operating instruction to the actuating mechanism, so that the actuating mechanism executes the operating instruction.

15. The non-transitory computer-readable storage medium according to claim 12, wherein the method further comprises:

sending the holographic image of the electrical device to a second display apparatus;

receiving an operation indication from the second display apparatus, wherein the operation indication is obtained by detecting an action of a second user of the second display apparatus using a second image capturing apparatus; and rendering the operation indication in the holographic image of the electrical device by using the first display apparatus.

* * * * *